(12) United States Patent
Inagawa

(10) Patent No.: US 11,288,644 B2
(45) Date of Patent: Mar. 29, 2022

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Nobuhiro Inagawa, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 16/723,116

(22) Filed: Dec. 20, 2019

(65) Prior Publication Data

US 2020/0226561 A1 Jul. 16, 2020

(30) Foreign Application Priority Data

Jan. 15, 2019 (JP) .............................. JP2019-004567

(51) Int. Cl.
*G06Q 20/10* (2012.01)
*G06Q 20/08* (2012.01)
*G06Q 20/42* (2012.01)
*G06Q 20/14* (2012.01)
*G06Q 20/32* (2012.01)
*G06K 7/14* (2006.01)
*G06K 19/06* (2006.01)

(52) U.S. Cl.
CPC ......... *G06Q 20/102* (2013.01); *G06K 7/1417* (2013.01); *G06K 19/06037* (2013.01); *G06Q 20/0855* (2013.01); *G06Q 20/14* (2013.01); *G06Q 20/3276* (2013.01); *G06Q 20/42* (2013.01)

(58) Field of Classification Search
None
See application file for complete search history.

(56) References Cited

U.S. PATENT DOCUMENTS

| | | | |
|---|---|---|---|
| 9,875,469 B1 * | 1/2018 | Chin | G06Q 20/3276 |
| 9,928,489 B2 * | 3/2018 | Ohnishi | G06Q 20/102 |
| 10,621,563 B1 * | 4/2020 | Spindel | G06Q 20/10 |
| 10,679,207 B1 * | 6/2020 | Huffines | G06Q 20/3278 |
| 2012/0166332 A1 * | 6/2012 | Naaman | G06Q 20/3278 705/40 |
| 2012/0173396 A1 * | 7/2012 | Melby | G06Q 30/04 705/34 |
| 2013/0041824 A1 * | 2/2013 | Gupta | G06Q 40/00 705/44 |
| 2014/0156508 A1 * | 6/2014 | Argue | G06Q 20/32 705/39 |

(Continued)

*Primary Examiner* — Kristy A Haupt
(74) *Attorney, Agent, or Firm* — Foley & Lardner LLP

(57) ABSTRACT

An information processing apparatus includes a management unit configured to manage setting data relating to remittance for paying at least a part of a price associated with a settled transaction from a payer to a payee associated with the settled transaction. The apparatus further includes a generation unit configured to generate instruction data containing instructions to display a screen requesting remittance from the payer based on the setting data, and an output unit configured to output the instruction data generated by the generation unit. The screen requesting remittance displays information identifying the settled transaction associated with the setting data.

17 Claims, 8 Drawing Sheets

(56) References Cited

U.S. PATENT DOCUMENTS

| | | | | |
|---|---|---|---|---|
| 2014/0164152 A1* | 6/2014 | Inukai | ............... | G06G 1/14 |
| | | | | 705/15 |
| 2014/0164234 A1* | 6/2014 | Coffman | ............ | G06Q 20/14 |
| | | | | 705/40 |
| 2014/0330654 A1* | 11/2014 | Turney | ............ | G06Q 20/3224 |
| | | | | 705/15 |
| 2015/0073959 A1* | 3/2015 | Connors | ............ | G06Q 40/00 |
| | | | | 705/35 |
| 2016/0117667 A1* | 4/2016 | Kang | ............... | G06Q 20/42 |
| | | | | 705/39 |
| 2017/0372282 A1* | 12/2017 | Sarin | ............... | G06Q 20/20 |
| 2018/0308086 A1 | 10/2018 | Shan et al. | | |
| 2020/0334724 A1* | 10/2020 | Garrett | ............... | G06K 9/228 |

* cited by examiner

FIG. 4

PAID SETTLEMENT LIST ~SC1

AR1
2018/12/23    A A A A A    10,000 yen

2018/12/25    B B B B B    20,500 yen
AR2

FIG. 5

BILL SPLIT PROCESS SETTING ~SC2

AR3
DATE :            2018/12/23
STORE :           A A A A A
PAYMENT AMOUNT :  10,000 yen

BILL SPLIT TYPE    EQUAL BILL SPLIT ▽ — BO1

AR4 —  4   PERSON

AR5 — Mr. A    2,500 yen  ST1
AR6 — Mr. B    2,500 yen  ST2
AR7 — Mr. C    2,500 yen  ST3

CONFIRM — BU1

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2019-004567, filed on Jan. 15, 2019, the entire contents of which are incorporated herein by reference.

FIELD

Embodiments described herein relate generally to an information processing apparatus and an information processing method.

BACKGROUND

A remittance service using a communication service such as a social networking service (SNS) is already in practical use. This remittance service also includes a service that realizes bill splitting. Bill splitting using the remittance service is realized by paying the full amount of a price of a transaction by one representative and then collecting a part of the price from another payer using the remittance service with the representative as a payee.

For that reason, when it is necessary to inform each payer of which transaction is targeted for bill splitting when collecting the part of the price, the payee needs to notify each payer using SNS or another type of communication. For this notification, the payee needs to attach a photo of the receipt or enter an explanatory note, which is troublesome. Under such circumstances, it is desired that each payer can easily recognize the transaction targeted for bill split.

DESCRIPTION OF THE DRAWINGS

FIG. 4 is a diagram illustrating a list screen;

FIG. 5 is a diagram illustrating an example of a setting screen;

DETAILED DESCRIPTION

Embodiments provide an information processing apparatus and an information processing method that allow a second settlement person to easily recognize the transaction targeted for bill split.

In general, according to one embodiment, an information processing apparatus includes a management unit, a generation unit, and output unit. The management means manages setting data relating to remittance for paying at least a part of a price relating to a settled transaction from a payer to a payee in association with the transaction. The generation unit generates instruction data for instructing display of a screen which is for requesting remittance to the payer based on the setting data and enabling the payer to identify the transaction associated with the setting data. The output unit outputs the instruction data generated by the generation unit.

Figure 1:
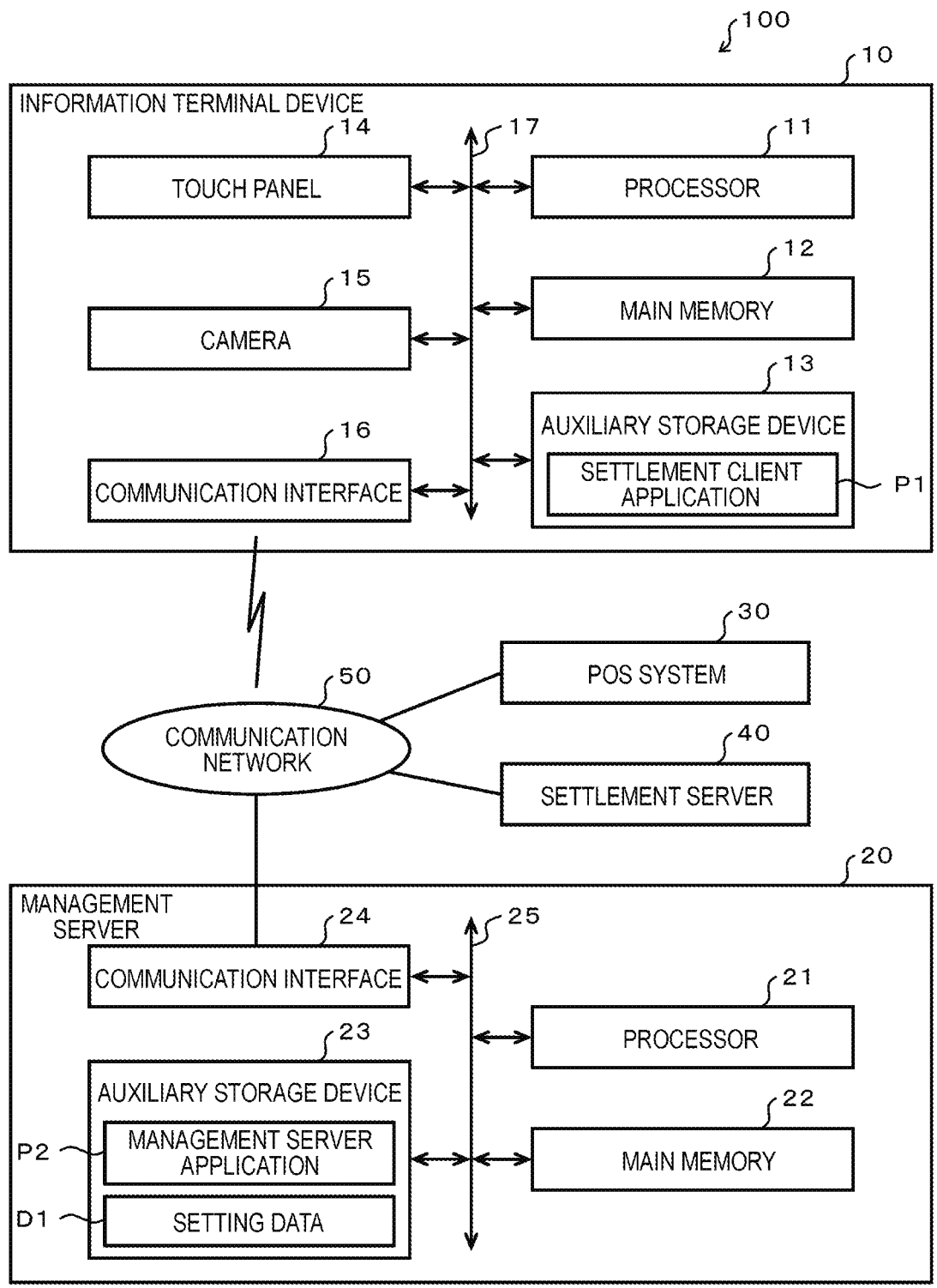
FIG. 1 is a block diagram illustrating a schematic configuration of a settlement system according to an embodiment and a main circuit configuration of an information terminal device and a management server included in the settlement system.

Hereinafter, an example of an exemplary embodiment will be described with reference to the drawings. FIG. 1 is a block diagram illustrating a schematic configuration of a settlement system 100 according to the embodiment and main circuit configurations of an information terminal device 10 and a management server 20 included in the settlement system 100. The settlement system 100 provides a settlement service using a two-dimensional code to the user. The settlement system 100 is configured by enabling the information terminal device 10, the management server 20, a point-of-sale (POS) system 30, and a settlement server 40 to communicate via a communication network 50.

The information terminal device 10 is used by a settlement service user, and functions as a user interface for the user to use the settlement service. As the information terminal device 10, a portable information processing device such as a smartphone, a mobile phone, or a tablet terminal is typically used. As the information terminal device 10, a stationary information processing device (an information processor) such as a desktop computer can be used. The management server 20 manages data and the like for providing a settlement service using a two-dimensional code in cooperation with the settlement server 40. The POS system 30 performs registration of contents of transaction, calculation of a price, settlement of the price, management of registration contents, settlement results, and the like, for the transaction in a store. The settlement server 40 performs information processing for providing the settlement service that enables settlement between users by online remittance. As the communication network 50, the Internet, a virtual private network (VPN), a local area network (LAN), a public communication network, a mobile communication network, or the like can be used alone or in an appropriate combination.

The information terminal device 10 includes a processor 11, a main memory 12, an auxiliary storage device 13, a touch panel 14, a camera 15, a communication interface 16, a transmission path 17, and the like. The processor 11, the main memory 12, the auxiliary storage device 13, the touch panel 14, the camera 15, and the communication interface 16 are connected via the transmission path 17. In the information terminal device 10, the processor 11, the main memory 12, and the auxiliary storage device 13 are connected by the transmission path 17 to make up a computer that performs information processing for controlling the information terminal device 10.

The processor 11 corresponds to a central part of the computer. The processor 11 controls each unit to implement various functions as the information terminal device 10 according to an information processing program such as an operating system, middleware, and an application program.

The main memory 12 corresponds to a main memory portion of the computer. The main memory 12 includes a nonvolatile memory area and a volatile memory area. The main memory 12 stores an information processing program in the nonvolatile memory area. The main memory 12 may store data necessary for the processor 11 to execute processing for controlling each unit in the nonvolatile or volatile memory area. The main memory 12 uses the volatile memory area as a work area in which data is appropriately rewritten by the processor 11.

The auxiliary storage device 13 corresponds to an auxiliary storage portion of the computer. The auxiliary storage device 13 is, for example, an electrically erasable programmable read-only memory (EEPROM). A hard disc drive (HDD), a solid state drive (SSD), or the like may be used as the auxiliary storage device 13. The auxiliary storage device 13 stores data used when the processor 11 performs various processes and data generated by the processes in the processor 11. The auxiliary storage device 13 stores an information processing program.

One of the information processing programs stored in the auxiliary storage device 13 is an application program P1 (hereinafter referred to as a settlement client application) for causing the information terminal device 10 to function as a settlement client that realizes a function such as a user interface for using a settlement service. However, typically, the settlement client application P1 is downloaded via the Internet, for example, and written in the auxiliary storage device 13 in response to an operation by a user of the information terminal device 10 or the like. That is, the transfer of the information terminal device 10 to the user who uses the information terminal device 10 is performed in a state where the settlement client application P1 is not stored in the auxiliary storage device 13. However, the information terminal device 10 may be transferred to the user in a state where the settlement client application P1 is stored in the auxiliary storage device 13.

The touch panel 14 functions as an input device and a display device of the information terminal device 10. The camera 15 includes an optical system and an image sensor, and generates image data representing an image in the field of view formed by the optical system by the image sensor.

The communication interface 16 is an interface for data communication via the communication network 50. As the communication interface 16, for example, a known communication device for performing data communication via a mobile communication network or the Internet can be used. The transmission path 17 includes an address bus, a data bus, a control signal line, and the like, and transmits data and control signals exchanged between connected units.

The management server 20 includes a processor 21, a main memory 22, an auxiliary storage device 23, a communication interface 24, a transmission path 25, and the like. The processor 21, the main memory 22, the auxiliary storage device 23, and the communication interface 24 are connected by the transmission path 25. The transmission path 25 includes an address bus, a data bus, a control signal line, and the like, and transmits data and control signals exchanged between connected units.

In the management server 20, a computer that performs information processing for controlling the management server 20 is configured by connecting the processor 21, the main memory 22, and the auxiliary storage device 23 via the transmission path 25.

The processor 21 corresponds to a central part of the computer. The processor 21 controls each unit to implement various functions as the management server 20 according to an information processing program.

The main memory 22 corresponds to a main memory portion of the computer. The main memory 22 includes a nonvolatile memory area and a volatile memory area. The main memory 22 stores an information processing program in the nonvolatile memory area. The main memory 22 may store data necessary for the processor 21 to execute processing for controlling each unit in the nonvolatile or volatile memory area. The main memory 22 uses the volatile memory area as a work area in which data is appropriately rewritten by the processor 21.

The auxiliary storage device 23 corresponds to an auxiliary storage portion of the computer. The auxiliary storage device 23 is, for example, the EEPROM, the HDD, and the SSD. The auxiliary storage device 23 stores data used when the processor 21 performs various processes and data generated by the processes in the processor 21. The auxiliary storage device 23 may store an information processing program. One of the information processing programs stored in the auxiliary storage device 23 is an application program (hereinafter referred to as a management server application) P2 for operation control as the management server 20. The auxiliary storage device 23 stores setting data D1 described later.

The communication interface 24 is an interface for data communication via the communication network 50. As the communication interface 24, for example, a known communication device for performing data communication via the Internet can be used.

The management server 20 can use a general purpose computer device as basic hardware, for example. In this case, typically, the computer device in which the management server application P2 is not stored in the auxiliary storage device 23 and the management server application P2 are individually transferred to a company or the like that uses the management server 20. The transfer of the management server application P2 can be realized by being recorded on a removable recording medium such as a magnetic disk, a magneto-optical disk, an optical disk, a semiconductor memory, or by being downloaded via a network. In this case, the management server application P2 is written in the auxiliary storage device 23 in response to an operation by an administrator or a service person of the management server 20. However, the management server 20 in which the management server application P2 is stored in the auxiliary storage device 23 of the computer device may be transferred to the company or the like.

Figure 2:
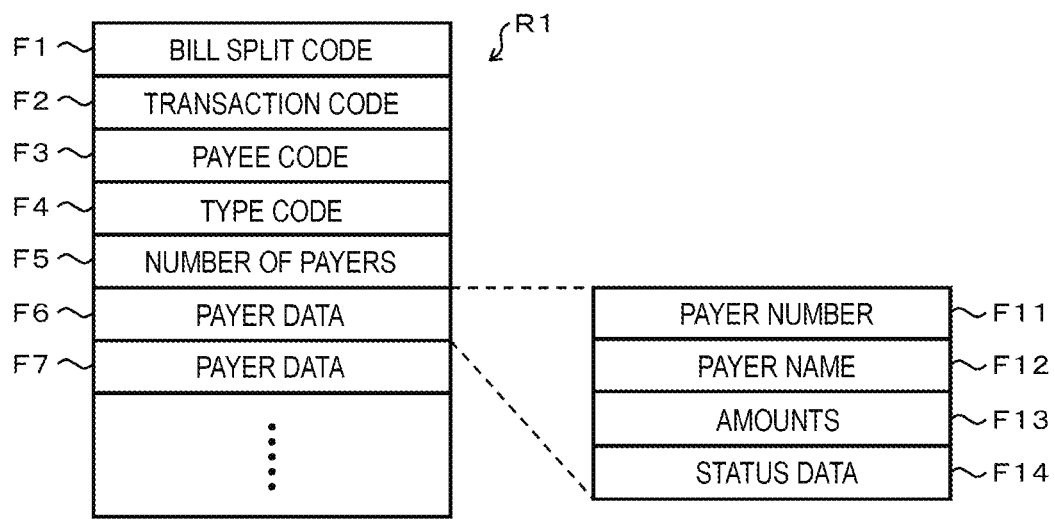
FIG. 2 is a diagram schematically illustrating a structure of a data record included in setting data illustrated in FIG. 1.

FIG. 2 is a diagram schematically illustrating a structure of a data record R1 included in the setting data D1. The setting data D1 represents settings relating to bill splitting of the price relating to a transaction that is settled in the POS system 30. The setting data D1 includes one or a plurality of data records R1. The number of data records R1 included in the setting data D1 varies depending on the number of bill split cases to be managed by the management server 20. The data record R1 is associated with each of bill split cases to be managed by the management server 20.

The data record R1 may include fields F1, F2, F3, F4, F5, and F6. In the field F1, a bill split code for identifying an associated bill split case is set. In the field F2, a transaction code for identifying a transaction that is a target of the associated bill split case is set. In the field F3, a user code (hereinafter referred to as a payee code) for identifying a user (hereinafter referred to as a payee) who receives payment with respect to the associated bill split case is set. In the field F4, a type code for identifying a type of bill split to be applied to the associated bill split case is set. In the field F5, the number of users (hereinafter referred to as payers) who pay for the associated bill split case is set. In the field F6, payer data associated with one payer is set. Respective fields of the field F7 and following fields are provided when there is a plurality of payers with respect to the associated bill split case. In each of these fields, payer data associated with the second and subsequent payers is set. When the associated bill split case is a bill split case with only two persons of a payee and one payer, the field F7 and following fields are not provided.

The payer data may include fields F11, F12, F13, and F14. In the field F11, a payer number for distinguishing an associated payer from another payer in the same bill split case is set. In the field F12, a name for the payee to identify the associated payer (hereinafter referred to as a payer name) is set. In the field F13, amounts to be paid by the associated payer are set. In the field F14, status data representing a payment status by the associated payer is set.

In the data record R1, for example, some fields such as the field F5 may be omitted, or another arbitrary data may be set by providing another field. For the payer data, for example, some fields such as the field F12 may be omitted, or another arbitrary data may be set by providing another field.

Next, an operation of the settlement system 100 configured as described above will be described. The contents of the various processes described below are examples, and it is possible to appropriately change the order of some processes, omit some processes, or add other processes.

A characteristic of the operation in the settlement system 100 is an operation when bill split is realized in such a way that, after one person settled all the costs relating to transactions such as eating and drinking with a plurality people, the person who made the settlement becomes a payee and collects each contribution from other payers. Therefore, this operation will be described below.

The payee settles all of prices relating to transactions such as eating and drinking with a plurality of people through the POS system 30. In this case, the payee uses the settlement service provided by the settlement server 40. That is, the settlement server 40 subtracts a settlement amount notified from the POS system 30 from the balance of the account associated with the payee. When the settlement server 40 completes the settlement, the settlement server 40 records the transaction code that uniquely identifies the settled transaction, the date on which the transaction was performed, the store name, and the like in association with the user or account. For such settlement, for example, an existing cashless settlement service called "QR settlement" can be used. However, this settlement may be any settlement including cash settlement as long as the settlement is made clear to the payee. That is, for example, cash settlement may be performed with acquisition of a user code of the payee.

The payee instructs the information terminal device 10 to activate a function as a settlement client. Then, the processor 11 starts information processing based on the settlement client application P1. Then, the payee performs a predetermined operation, for example, on the touch panel 14 to declare that setting of bill split is started. Then, the processor 11 requests the management server 20 to start setting bill split with the notification of a user code of the payee. The user code is determined so that each user of the settlement service provided by the settlement system 100 can be identified. For example, the user code designated by the user in usage setting of the settlement client application P1 is stored in the main memory 12 or the auxiliary storage device 13 by the processor 11.

Figure 3:
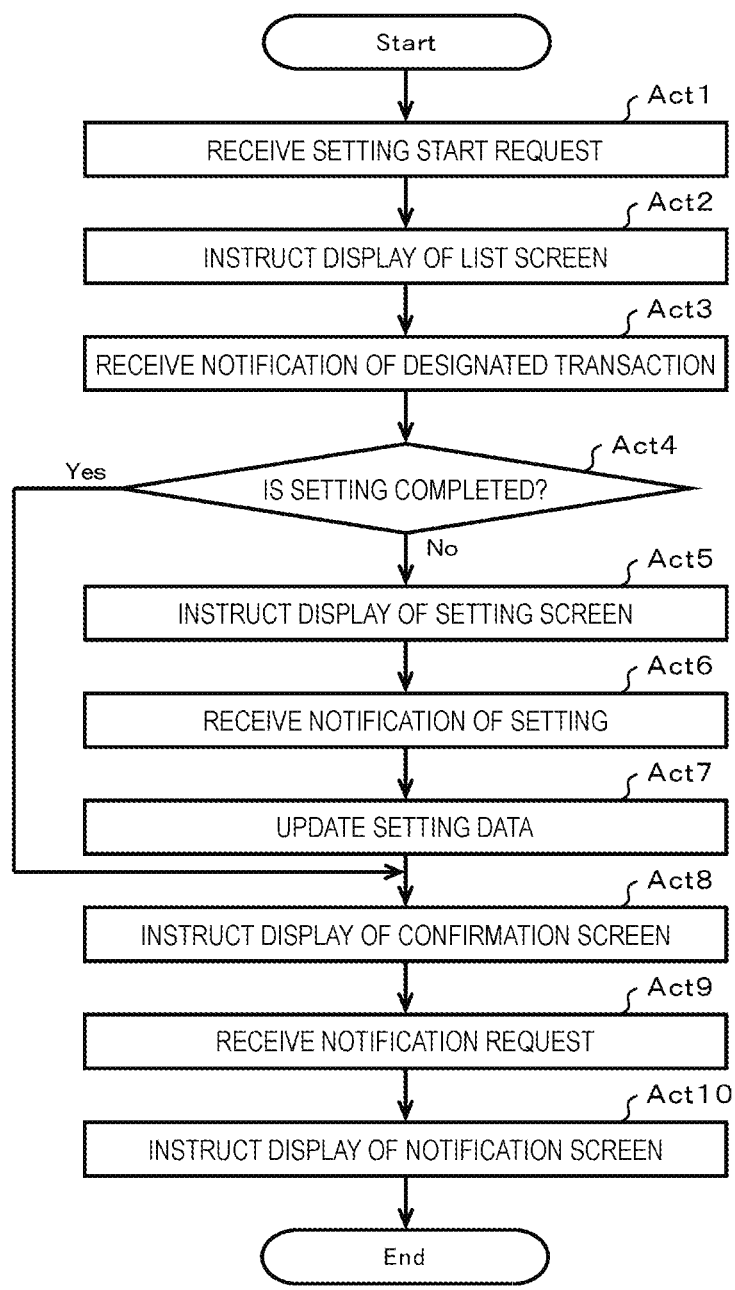
FIG. 3 is a flowchart illustrating a procedure of information processing in a setting process of a processor included in the management server in FIG. 1.

When the request is received by the communication interface 24, the processor 21 starts a setting process based on the management server application P2. FIG. 3 is a flowchart illustrating a procedure of information processing of the processor 21 in the setting process.

As Act 1, the processor 21 receives the request. The processor 21 associates a session identifier (ID) of a session established for the request and the notified user code with each other and stores the session identifier and notified user code in the main memory 22 or the auxiliary storage device 23. Then, the processor 21 executes communication with the information terminal device 10 relating to the setting process described below as being related to the session identified by the session ID.

As Act 2, the processor 21 instructs the information terminal device 10 to display a list screen. The list screen is a screen illustrating a list of transactions settled by the payee. For example, the processor 21 inquires of the settlement server 40 and acquires a transaction code, a date, a store name, and a settlement amount relating to the settlement performed by the payee as a settlement party. Hereinafter, a combination of the date, the store name, and the settlement amount relating to one transaction is referred to as transaction specific information. If there is a plurality of transactions settled by the payee and managed by the settlement server 40, the processor 21 acquires the transaction code and transaction specific information for each of the plurality of transactions. The processor 21 stores the acquired transaction code and transaction specific information in the main memory 22 or the auxiliary storage device 23 in association with the session ID. Then, the processor 21 transmits instruction data for instructing display of the list screen to the information terminal device 10 with the notification of the acquired transaction specific information.

In the information terminal device 10, when the processor 11 receives the instruction data, the processor 11 generates the list screen based on a predetermined form and information notified by the instruction data, and displays the list screen on the touch panel 14.

FIG. 4 is a diagram illustrating a list screen SC1. The list screen SC1 is an example of a case where two pieces of transaction specific information are notified with the instruction data. The list screen SC1 includes display areas AR1 and AR2. Each of the display areas AR1 and AR2 represents contents of the notified transaction specific information. For example, the processor 11 displays a character string representing a date, a store name, and a payment amount included in one of the notified two pieces of transaction specific information in the display area AR1. For example, the processor 11 displays a character string representing a date, a store name, and a payment amount included in the other of the notified two pieces of transaction specific information in the display area AR2. The processor 11 does not represent the display area AR2 when there is only one piece of transaction specific information notified by the instruction data. The processor 11 adds another display area similar to the display areas AR1 and AR2 when there are three or more pieces of transaction specific information notified by the instruction data.

The payee selects the transaction targeted for bill split from the transactions illustrated on the list screen displayed on the touch panel 14. Then, a predetermined operation for designating the selected transaction is performed. The operation is, for example, a touch on an area where information relating to the selected transaction is illustrated. In response to such an operation, the processor 11 notifies the management server 20 of a designated transaction (hereinafter referred to as a designated transaction). For example, the processor 11 transmits the transaction code of the designated transaction to the management server 20.

As Act 3 in FIG. 3, the processor 21 receives a notification of the designated transaction performed as described above. As Act 4, the processor 21 confirms whether or not setting of bill split is completed for the designated transaction. For example, the processor 21 confirms whether or not the setting data D1 includes the data record R1 in which the transaction code of the notified designated transaction is set in the field F2. When the corresponding data record R1 is not found, the processor 21 determines that the determination result in Act 4 is No, and proceeds to Act 5.

As Act 5, the processor 21 instructs the information terminal device 10 to display a setting screen. The setting screen is a screen for the payee to set in what form the specified transaction is split. For example, the processor 21 transmits the instruction data for instructing display of the setting screen to the information terminal device 10 with the notification of the transaction specific information acquired in Act 2 regarding the designated transaction.

In the information terminal device 10, when the processor 11 receives the instruction data, the processor 11 generates a setting screen based on a predetermined form and information notified by the instruction data, and displays the setting screen on the touch panel 14.

FIG. 5 is a diagram illustrating a setting screen SC2. The setting screen SC2 is an example of a case where the payee designates a transaction at a store whose store name is "AAAAA" on Dec. 23, 2018 on the list screen SC1 in FIG. 4. The setting screen SC2 is an example of a state in which "4" is already set as the number of persons targeted for bill split. The setting screen SC2 includes a display area AR3, a list box BO1, input areas AR4, AR5, AR6, and AR7, character strings ST1, ST2, and ST3, and a button BU1.

The display area AR3 represents the date, the store name, and the settlement amount for the transaction targeted for bill split. The processor 11 displays a character string representing the date, the store name, and the settlement amount included in the transaction specific information notified by the instruction data in the display area AR3.

The list box BO1 receives designation of a type of bill split. In the embodiment, there are two types of bill split, "equal bill split" and "designated bill split". The processor 11 represents the list box predetermined as s part of the form as the list box BO1.

The input area AR4 is an area for inputting and displaying the number of persons targeted for bill split. The input area AR5 is an area for inputting and displaying a name of a payer whose payer number is "1". The input area AR6 is an area for inputting and displaying a name of a payer whose payer number is "2". The input area AR7 is an area for inputting and displaying a name of a payer whose payer number is "3". The processor 11 sets the name of the payer as a default name in an initial state. In the embodiment, the default names of payers whose payment numbers are "1", "2", and "3" are "Mr. A", "Mr. B", and "Mr. C". The processor 11 changes the name of each payer according to free input in each of the input areas AR4, AR5, and AR6.

The character strings ST1, ST2, and ST3 represent amounts to be paid by the payers whose payment numbers are "1", "2", and "3", respectively. The processor 11 sets "2,500 yen", which is amounts obtained by equally dividing the settlement amount notified by the instruction data by the number of persons input in the input area AR4, as each of the character strings ST1, ST2, and ST3. The button BU1 is a button that the payee presses to declare that the setting is confirmed. The processor 11 represents a button predetermined as a part of the form as the button BU1.

In the initial state, for example, the processor 11 leaves the input area AR4 blank and does not represent the input areas AR5, AR6, and AR7 and the character strings ST1, ST2, and ST3. Then, the processor 11 changes the number of areas corresponding to the input areas AR5, AR6, and AR7 and the contents and number of character strings corresponding to the character strings ST1, ST2, and ST3, according to the number of persons input to the input area AR4.

Figure 6:
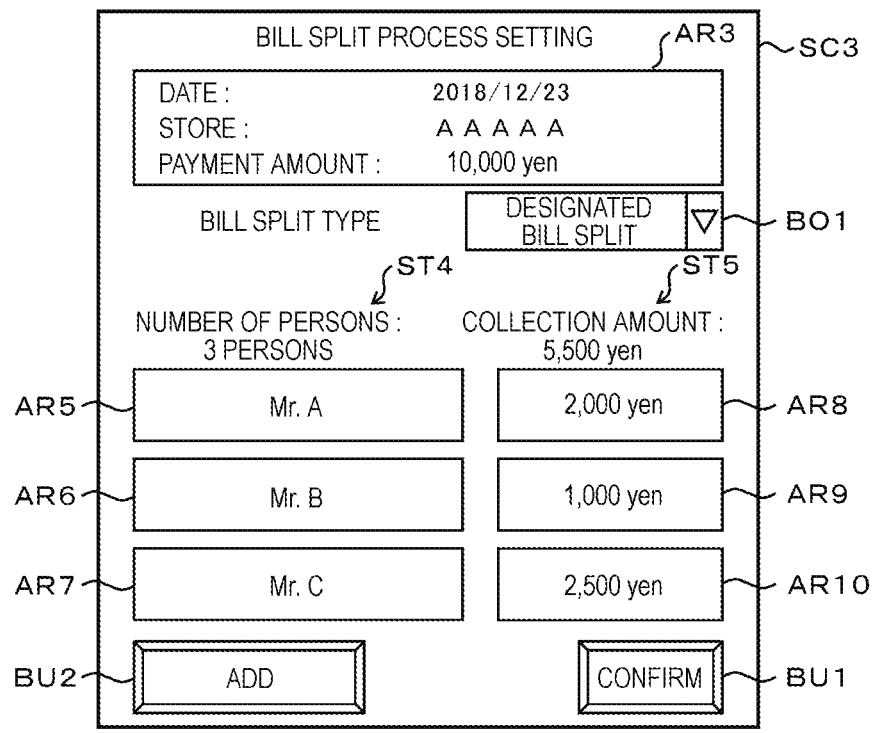
FIG. 6 is a diagram illustrating another example of the setting screen.

The processor 11 updates the setting screen when "designated bill split" is designated in the list box BO1. FIG. 6 is a diagram illustrating a setting screen SC3 when the type of bill split is "designated bill split". The setting screen SC3 is an example of a setting screen that is displayed in response to the designation of "designated bill split" in the list box BO1 in a state where the setting screen SC2 illustrated in FIG. 5 is displayed. The setting screen SC3 is an example of a setting screen after changing the payment amounts of each payer. In FIG. 6, the same display elements as those in FIG. 5 are denoted by the same reference numerals, and detailed description thereof is omitted. The setting screen SC3 includes the display area AR3, the list box BO1, input areas AR5, AR6, AR7, AR8, AR9, and AR10, character strings ST4, ST5, and buttons BU1 and BU2.

In the input areas AR8, AR9, and AR10, the amounts to be paid by the payers whose payment numbers are "1", "2", and "3" are input and displayed, respectively. The setting screen SC3 illustrates a state after "2,000 yen", "1,000 yen", and "2,500 yen" are respectively input to the input areas AR8, AR9, and AR10. The character string ST4 represents the number of payers. The character string ST5 represents the total amount collected from the payers. The processor 11 includes, in the character string ST5, the total amount of money that is input in each of the input areas AR8, AR9, and AR10. The button BU2 is a button that the payee presses to declare that a payer is to be added. The processor 11 represents a button predetermined as a part of the form as the button BU2.

When the button BU2 is pressed, the processor 11 updates the setting screen so that a pair of input areas equivalent to the input area AR5 and the input area AR8 are added and the number of persons represented by the character string ST4 is increased by one. Specifically, when the button BU2 is pressed in a state where the setting screen does not include the input areas AR7 and AR10 on the setting screen SC3, the processor 11 adds the input areas AR7 and AR10 and changes to the setting screen SC3. However, in this case, the processor 11 represents "0 yen" in the input area AR10 or blanks the input area AR10 to indicate that the amount is not yet set.

The payee sets bill split on the setting screen displayed on the touch panel 14. For example, the payee selects the type of bill split in the list box BO1. For example, the payee changes the number of payers by inputting a numerical value in the input area AR4 or pressing the button BU2. For example, the payee changes the name for identifying the payer by free input to the input areas AR4, AR5, AR6, and the like. The names set in the input areas AR4, AR5, AR6, and the like are names for the payee to identify the payer and do not need to match the payer name. For example, the payee changes the payment amounts of the payers by inputting numerical values in the input areas AR8, AR9, AR10, and the like, respectively. The payee presses the button BU1 when the setting is ended. Then, the processor 11 notifies the management server 20 of the type code indicating the set bill split type, the number of payers, the number of each payer, the name, and the payment amounts as a response to the instruction data. Accordingly, as Act 6 in FIG. 3, the processor 21 receives the notification of the setting.

As Act 7, the processor 21 updates the setting data D1 to include a new data record R1 based on the notification described above. For example, as described below, the processor 21 generates the new data record R1 as a set of data for managing new settings performed in the information terminal device 10 as described above.

The processor 21 determines a bill split code different from the bill split code set in the field F1 of the data record R1 already included in the setting data D1, and sets the new bill split code in the field F1 of the new data record R1. The processor 21 sets a transaction code for identifying the designated transaction notified in Act 3 in the field F2 of the new data record R1. The processor 21 sets the user code stored in association with the session ID of the session being executed, as the payee code, in the field F3 of the new data record R1. The processor 21 sets the notified type code and the number of payers in the fields F4 and F5 of the new data record R1, respectively. The processor 21 sets the same number of payer data as the notified number of payers in the respective fields of the field F6 and following fields. The processor 21 generates the payer data by setting the notified payer number, payers name, and payment amounts in the fields F11, F12, and F13, respectively, and setting status data indicating that no request is made in the field F14. Thus, the data record R1 of the setting data D1 represents the settings relating to remittance for paying at least a part of the price relating to the settled transaction from the payer to the payee, and includes the transaction code and is associated with the transaction described above. That is, the processor 21 manages the settings in association with the transaction by updating the setting data D1 as described above. Thus, the processor 21 executes information processing based on the management server application P2 such that the computer having the processor 21 as a central part functions as a management unit.

When update of the setting data is completed, the processor 21 proceeds to Act 8. When the data record R1 in which the transaction code of the designated transaction is set in the field F2 is already included in the setting data D1 before updating as described above, the processor 21 determines that a determination result in Act 4 is Yes. In this case, the processor 21 passes Act 5 to Act 7 and proceeds from Act 4 to Act 8.

As Act 8, the processor 21 instructs the information terminal device 10 to display a confirmation screen. The confirmation screen is a screen for allowing the payee to confirm the setting status regarding bill split. For example, the processor 21 transmits instruction data for instructing display of a confirmation screen to the information terminal device 10 with the notification of transaction specific information stored in association with the session ID of the session being executed and payer data included in newly generated data record R1 as described above.

In the information terminal device 10, when the processor 11 receives the instruction data, the processor 11 generates a confirmation screen based on a predetermined form and information notified in the instruction data, and displays the confirmation screen on the touch panel 14.

Figure 7:
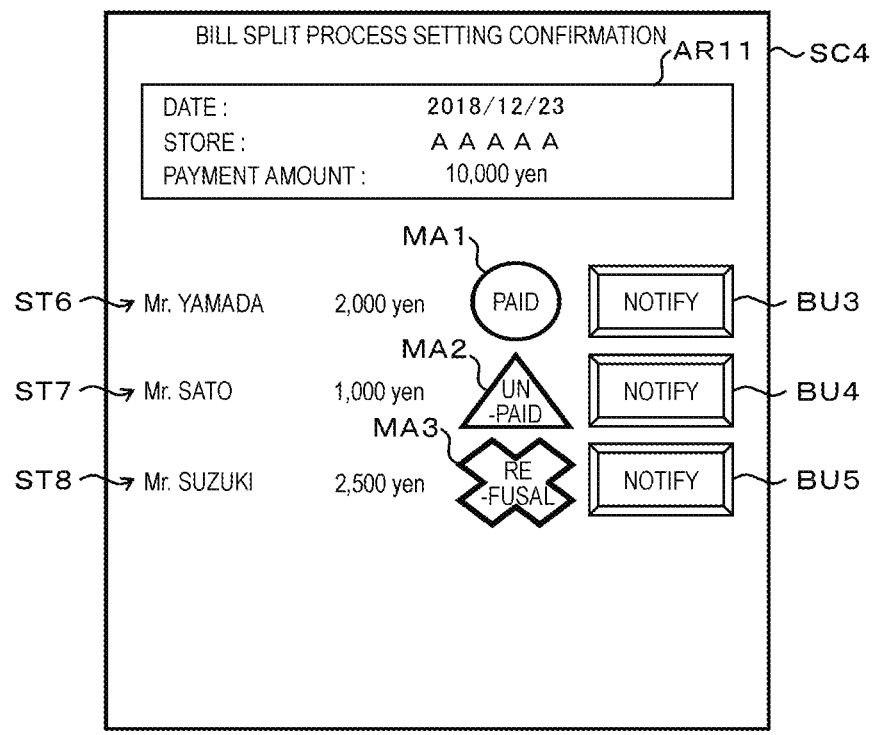
FIG. 7 is a diagram illustrating an example of a confirmation screen.

FIG. 7 is a diagram illustrating a confirmation screen SC4. The confirmation screen SC4 is an example of a confirmation screen that is displayed in response to the button BU1 being pressed on the setting screen SC3 illustrated in FIG. 6. The confirmation screen SC4 is an example of a case where the names of the payers are changed to "Mr. Yamada", "Mr. Sato", and "Mr. Suzuki", respectively, in the setting screen SC3, by free input in the input areas AR4, AR5, and AR6. The confirmation screen SC4 includes a display area AR11, character strings ST6, ST7, and ST8, buttons BU3, BU4, and BU5, and marks MA1, MA2, and MA3.

The display area AR11 represents the date, the store name, and the settlement amount for the transaction targeted for bill split. The processor 11 displays a character string representing the date, the store name, and the payment amounts included in the transaction specific information, which is notified in the instruction data, in the display area AR11.

The character string ST6 represents the name and payment amounts of the payer whose payer number is "1". The character string ST7 represents the name and payment amounts of the payer whose payer number is "2". The character string ST8 represents the name and payment amounts of the payer whose payer number is "3". The processor 11 sets, for example, a character string representing the payer name and amount set in the fields F12 and F13 of the payer data in which "1" is set in the field F11 among the payer data included in the instruction data as the character string ST6. The processor 11 sets, for example, a character string representing the payer name and amount set in the fields F12 and F13 of the payer data in which "2" is set in the field F11 among the payer data included in the instruction data as the character string ST7. The processor 11 sets, for example, a character string representing the payer name and amount set in the fields F12 and F13 of the payer data in which "3" is set in the field F11 among the payer data included in the instruction data as the character string ST8.

The button BU3 is a button that the payee presses to declare that the payer whose payer number is "1" is notified of bill split. The button BU4 is a button that the payee presses to declare that the payer whose payer number is "2" is notified of bill split. The button BU5 is a button that the payee presses to declare that the payer whose payer number is "3" is notified of bill split. The processor 11 represents buttons predetermined as a part of the form as the buttons BU3, BU4, and BU5.

The mark MA1 represents a state of bill split process for the payer whose payer number is "1". In FIG. 7, the mark MA1 represents that payment is completed. For example, the processor 11 arranges an appearance mark corresponding to a processing status represented by the status data, which is set in the field F14 of the payer data in which "1" is set in the field F11 among the payer data included in the instruction data, as the mark MA1 on the confirmation screen. For example, the processor 11 arranges an appearance mark corresponding to a processing status represented by the status data, which is set in the field F14 of the payer data in which "2" is set in the field F11 among the payer data included in the instruction data, as the mark MA2 on the confirmation screen. For example, the processor 11 arranges an appearance mark corresponding to a processing status represented by the status data, which is set in the field F14 of the payer data in which "3" is set in the field F11 among the payer data included in the instruction data, as the mark MA3 on the confirmation screen. The appearance of the mark MA1 in FIG. 7 is an example of a case where the processing status is "paid". Appearance of the mark MA2 in FIG. 7 is an example of a case where the notification about bill split is completed but payment is not performed. Appearance of the mark MA3 in FIG. 7 is an example of a case where the payer refuses to pay for bill split. However, when the processor 11 displays the confirmation screen for the first time, that is, immediately after setting of bill split is completed, the status data set in the field F14 of all payer data is in a state indicating that the notification for the bill split is not performed. For that reason, the processor 11 does not display any of the marks MA1, MA2, and MA3. Alternatively, the processor 11 represents predetermined display objects in appearance indicating that notification is not performed as marks MA1, MA2, and MA3.

When the payee wants to notify the payer about the set bill split, the payee performs a predetermined operation for declaring that effect. For example, if the payee wants to notify "Mr. Sato" of the payers illustrated on the confirmation screen SC4 of FIG. 7, the payee presses the button BU4. In response to this, the processor 11 requests the management server 20 to notify the two-dimensional code with the notification of the payer number corresponding to the pressed button. Therefore, as Act 9 in FIG. 3, the processor 21 receives the notification request.

As Act 10, the processor 21 instructs the information terminal device 10 to display a notification screen in response to the request. The notification screen is a screen for the payee to notify one of the payers of the contents of settings relating to the payer. For example, the processor 21 generates image data representing a two-dimensional code. The processor 21 includes a predetermined control code indicating that the data is relating to bill split in the data represented by the two-dimensional code. The processor 21 includes bill split code set in the field F1 of the data record R1 in which the transaction code of the designated transaction is set in the field F2 in the data represented by the two-dimensional code. The processor 21 includes the payer number notified in the request received in Act 9 in the data represented by the two-dimensional code. The processor 21 may include other arbitrary data such as a uniform resource locator (URL) for accessing the management server 20 in the data represented by the two-dimensional code. The processor 21 selects the payer data whose payer number set in the field F11 matches the payer number notified in the request received in Act 9, from among the payer data included in the data record R1 in which the transaction code of the designated transaction is set in the field F2. Then, the processor 21 transmits instruction data for instructing display of the notification screen to the information terminal device 10 with the notification of the transaction specific information stored in association with the session ID of the session being executed, the payer name and amounts set in the fields F12 and F13 of the selected payer data, and the generated image data.

In the information terminal device 10, when the processor 11 receives the instruction data, the processor 11 generates a notification screen based on a predetermined form and information notified by the instruction data, and displays the notification screen on the touch panel 14. That is, the processor 11 changes the display screen of the touch panel 14 from the confirmation screen to the notification screen.

Figure 8:
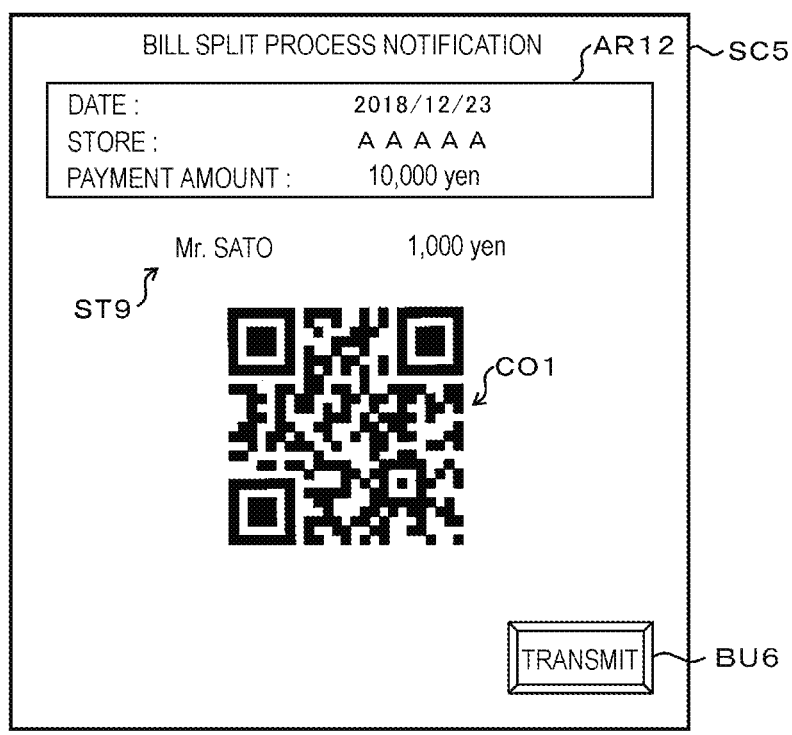
FIG. 8 is a diagram illustrating an example of a notification screen.

FIG. 8 is a diagram illustrating a notification screen SC5. The notification screen SC5 is an example of a notification screen that is displayed in response to the button BU4 being pressed on the confirmation screen SC4 illustrated in FIG. 7. The notification screen SC5 includes a display area AR12, a character string ST9, a two-dimensional code CO1, and a button BU6.

The display area AR12 represents a date, a store name, and a settlement amount for a transaction targeted for bill split. The processor 11 represents a character string representing the date, the store name, and the payment amounts included in the transaction specific information notified by the instruction data in the display area AR12. The character string ST9 represents the name of the payer and the payment amount. For example, the processor 11 sets a character string representing the payer name and the amount notified by the instruction data as the character string ST9.

The two-dimensional code CO1 is displayed for reading by another information terminal device 10 used by the payer. For example, the processor 11 arranges an image represented by the image data notified by the instruction data on the notification screen SC5 as the two-dimensional code CO1. The button BU6 is a button that the payee presses to declare that the image data of the two-dimensional code CO1 is to be transmitted. The processor 11 represents a button predetermined as a part of the form as the button BU6.

When the payer identified by the payer name of "Mr. Sato" is in the vicinity (i.e., less than a set distance away), the payee shows the notification screen SC5 to the payer. The payer recognizes the transaction targeted for bill split based on the character string illustrated in the display area AR12. Then, the payer causes the information terminal device 10 different from the information terminal device 10 displaying the notification screen SC5 to read the two-dimensional code CO1.

Alternatively, when the payer identified by the payer name "Mr. Sato" is at a remote location (more than a set distance away), the payee presses the button BU6. Then, the processor 11 activates a predetermined communication application, and transmits the information notified by the instruction data to the information terminal device 10 (hereinafter referred to as a payer terminal 10) designated by the payee, which is different from the information terminal device 10 displaying the notification screen SC5. The communication application is, for example, a mailer for transmitting electronic mail or a communication application using social networking service (SNS). For example, if a mailer is used, the processor 11 sets a character string representing the date, the store name and the payment amount, the payer name and the payment amounts included in the transaction specific information notified by the instruction data in the mail body and causes the mailer to create e-mail data with image data representing a two-dimensional code as attached data. Then, the processor 11 causes the e-mail data to be transmitted by the mailer to a mail address to be received by the payer terminal 10.

The payer activates the communication application on the payer terminal 10 to receive and display the information transmitted as described above from the information terminal device 10. With this configuration, the payer confirms the date, the store name, the settlement amount, and the amount to be paid for the transaction targeted for bill split. Then, the payer activates the settlement client application P1 on the payer terminal 10, and recognizes the two-dimensional code represented by the image data included in the information transmitted from the information terminal device 10 as described above. With this configuration, the processor 11 of the payer terminal 10 acquires bill split code and the payer number. In response to this, the processor 11 requests the management server 20 to start a payment process with the notification of a user code of the payer, the acquired bill split code, and the payer number.

Figure 9:
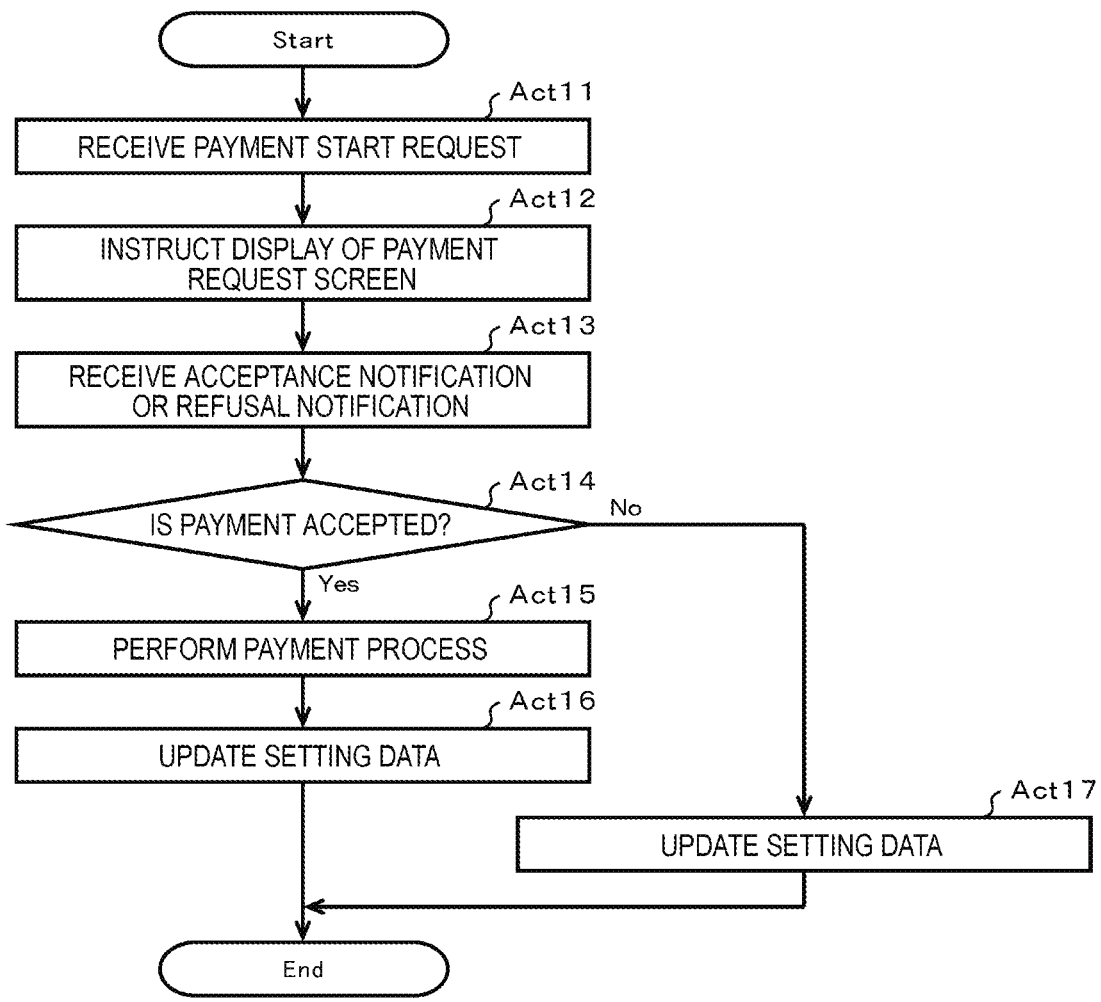
FIG. 9 is a flowchart illustrating a procedure of information processing in a payment process of the processor included in the management server in FIG. 1.

When the request is received by the communication interface 24, the processor 21 starts the payment process based on the management server application P2. FIG. 9 is a flowchart illustrating a procedure of information processing of the processor 21 in the payment process.

As Act 11, the processor 21 receives the request. In this case, the processor 21 associates a session ID of a session established for the request with the notified bill split code and stores the session ID and notified bill split code in the main memory 22 or the auxiliary storage device 23. Then, the processor 21 executes communication with the payer terminal 10 relating to the payment process described below as being related to the session identified by the session ID.

As Act 12, the processor 21 instructs the information terminal device 10 to display a payment request screen. The payment request screen is a screen for requesting the payer to pay by bill split. For example, the processor 21 extracts, from the setting data D1, the data record R1 in which bill split code notified by the request received in Act 11 is set in the field F1. The processor 21 inquires of the settlement server 40 and acquires transaction specific information relating to the transaction identified by the transaction code set in the field F2 of the extracted data record R1. The processor 21 acquires the name associated with the payee code set in the field F3 of the extracted data record R1 as a requester's name. In the embodiment, a rule that the user registers in advance a name to be disclosed to the payer when becoming a payee is adopted. The processor 21 stores the name designated by the user according to this rule in the main memory 22, the auxiliary storage device 23, or the like in association with the user code. Then, the processor 21 acquires the name associated with the payee code among the names stored in this way as the requester name. The processor 21 selects payer data in which the payer number notified by the request received in Act 11 is set in the field F11, from among the payer data included in the extracted data record R1. Then, the processor 21 acquires the amount set in the field F13 of the selected payer data as a requested amount. The processor 21 transmits instruction data for instructing display of the payment request screen to the payer terminal 10 with the notification of the acquired transaction specific information, the requester name, and the requested amount. As such, the payment request screen is a screen for requesting remittance to the payer based on the settings illustrated in the data record R1 of the setting data D1. The date and store name displayed on the payment request screen are information for the payer to identify the transaction. Thus, the processor 21 executes the information processing based on the management server application P2 such that the computer including the processor 21 as a central part functions as a generation unit that generates instruction data for instructing display of the screen. The computer including the processor 21 as the central part outputs instruction data by transmitting the instruction data, and functions as an output unit.

In the payer terminal 10, when the processor 11 receives the instruction data, the processor 11 generates a payment request screen based on a predetermined form and information notified by the instruction data, and displays the payment request screen on the touch panel 14.

Figure 10:
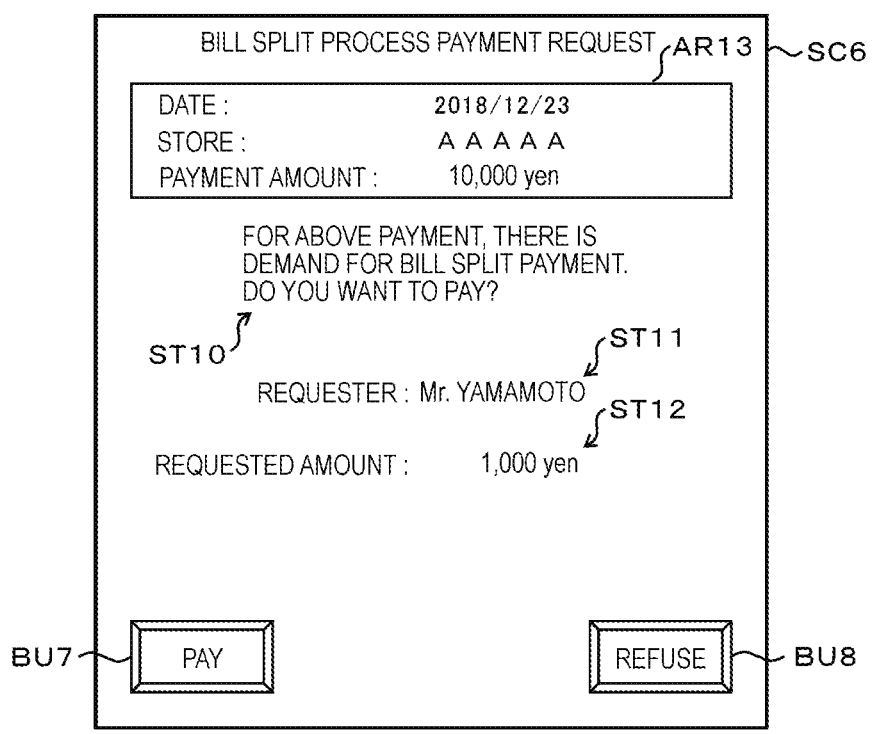
FIG. 10 is a diagram illustrating an example of a payment request screen.

FIG. 10 is a diagram illustrating a payment request screen SC6. The payment request screen SC6 is an example of a case where the payment server 10 requests the management server 20 to start a payment process as described above based on the notification screen SC5 illustrated in FIG. 8. The payment request screen SC6 includes a display area AR13, character strings ST10, ST11, and ST12, and buttons BU7 and BU8.

The display area AR13 represents a date, a store name, and a settlement amount for a transaction targeted for bill split. The processor 11 represents a character string representing the date, the store name, and the payment amounts included in the transaction specific information notified by the instruction data in the display area AR13.

The character string ST10 represents a message for guidance to the payer. For example, the processor 11 represents a character string predetermined as a part of the form as the character string ST10. The character string ST11 represents a name of a payee. The processor 11 represents, as the character string ST11, a character string in which the requester name notified by the instruction data is followed by a fixed character string "requester:". The character string ST12 represents amounts to be paid by the payer. The processor 11 represents, as the character string ST12, a character string in which the requested amount notified by the instruction data is followed by a fixed character string "requested amount:".

The button BU7 is a button that the payer presses to declare that payment of the requested amount is accepted. The button BU8 is a button that the payer presses to declare that the payment of the requested amount is refused. The processor 11 represents the buttons predetermined as part of the form as the buttons BU7 and BU8.

Based on the payment request screen SC6, the payer can confirm that a payee named "Mr. Yamamoto" is requesting payment of 1,000 yen for the transaction in which the payment amounts at the store "AAAAA" was 10,000 yen on Dec. 23, 2018. Then, the payer presses the button BU7 when accepting the payment of the requested amount, and presses the button BU8 when refusing the payment of the requested amount. The processor 11 sends an acceptance notification to the management server 20 when the button BU7 is pressed and sends a refusal notification when the button BU8 is pressed.

As Act 13 in 9, the processor 21 receives the acceptance notification or the refusal notification. As Act 14, the processor 21 confirms whether or not the payment is accepted. Then, when the acceptance notification is received in Act 13, the processor 21 determines that the determination result in Act 14 is Yes, and proceeds to Act 15.

As Act 15, the processor 21 performs a process for payment from the payer to the payee. For example, the processor 21 requests the settlement server 40 to remit the requested amount from a payer's account to a payee's account. Then, when completion of the remittance is notified from the settlement server 40, the processor 21 proceeds to Act 16.

As Act 16, the processor 21 updates the setting data D1 so as to be able to manage that the payment is completed. For example, the processor 21 updates the status data set in the field F14 of the payer data selected in Act 12 to "paid". Then, the processor 21 ends the payment process.

On the other hand, when the processor 21 receives the refusal notification in Act 13, the processor 21 determines that the determination result in Act 14 is No, and proceeds to Act 17. As Act 17, the processor 21 updates the setting data D1 so as to be able to manage that the payment is refused. For example, the processor 21 updates the status data which is set in the field F14 of the payer data selected in Act 12 to "refusal". Then, the processor 21 ends the payment process.

As described above, in the setting data D1, the management server 20 manages the settings relating to bill split in association with the transaction targeted for bill split. Then, the management server 20 outputs, for example, instruction data for instructing display of a screen representing information for specifying the transaction targeted for bill split, such as the payment request screen SC6 illustrated in FIG. 10, as the payment request screen for requesting payment to the payer. Accordingly, the payer can easily recognize each transaction targeted for bill split by visual observation of the payment request screen displayed according to the instruction data.

Since the management server 20 can include a plurality of pieces of payer data in the setting data D1, the management server 20 can also cope with bill split between three or more parties.

Since the management server 20 includes, as information for specifying the transaction, the date indicating the timing when the transaction is performed and the store name indicating the place where the transaction is performed, the payer can intuitively recognize the transaction targeted for bill split.

The management server 20 transmits instruction data for instructing display of the payment request screen to the payer terminal 10 which is the information terminal device 10 used by the payer. Then, the payer terminal 10 displays a payment request screen according to the instruction data. For that reason, the payer can recognize which transaction is requested to be paid in bill splitting, by displaying the payment request screen on the information terminal device 10 used by the payer.

The management server 20 also represents information for identifying the transaction targeted for bill split on the setting screen and confirmation screen for setting and confirmation for bill split, or on the notification screen for the payee to notify the payer of the contents of setting for bill split. For that reason, the payee and the payer can recognize a targeted transaction in various situations relating to the process of bill split.

This embodiment can be implemented by being variously modified as follows. The processor 11 may store the notified transaction specific information with the session ID or the like in the main memory 12 or the auxiliary storage device 13 in association with each other, and represent the character string representing the date, the store name, and the payment amounts included in the stored transaction specific information in the display areas AR11 and AR12. In this case, the processor 21 may omit the notification of the transaction specific information in Act 5, Act 8, and Act 10.

The processor 21 may generate at least a part of the list screen, the setting screen, the confirmation screen, the notification screen, and the payment request screen in the management server 20. Then, screen data representing each screen may be transmitted from the management server 20 to the information terminal device 10, and screen display based on the screen data may be performed by the information terminal device 10. In addition to this, it is possible to apply various existing methods for displaying the screen on the information terminal device 10 in order to display the screen on the client in response to an instruction from the server.

A part or all of the functions realized by the processor 11 or 21 by information processing can be realized by hardware such as a logic circuit that executes information processing not based on a program. Each of the functions described above can also be realized by combining software control with hardware such as the logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
at least one computer configured to:
manage setting data relating to remittance for paying at least a part of a price associated with a settled transaction from a payer to a payee associated with the settled transaction;
generate instruction data containing instructions to display a screen requesting remittance from the payer based on the setting data, wherein the screen displays information identifying the settled transaction associated with the setting data;
output the instruction data generated,
the at least one computer including an information terminal device, usable by the payee, configured to:
display, on the screen, a bill split process setting interface prompting a selection from among an equal split mode or a designated bill split mode, the equal split mode indicating payers to pay an equal amount of at least part of the price, the designated bill split mode allowing for each payer to select a different amount of the price, the bill split process setting interface including a button prompting an addition of a payer to the bill split process setting interface, the bill split process setting screen including a button prompting a confirmation that the price has been paid,
the setting data including payer data associated with each payer, the payer data including information identifying the associated payer, including a name of the associated payer,
the setting data further including an amount owed by the payer and a payment status associated with the payer for the settled transaction, the payment status to be displayed being one or more of a plurality of statuses, including (i) a first status that the amount owed is paid, (ii) a second status that the amount owed is unpaid, or (iii) a third status that the amount owed is refused to be paid, such that for a plurality of payers, the screen displays a plurality of payer names, the amount owed associated with each of the displayed payer names, and the payment status for each amount owed, and each different status among the plurality of statuses being depicted with a differently shaped graphical indicator.

2. The information processing apparatus of claim 1, wherein the setting data relates to remittance for paying at least a part of the price from each of a plurality of payers to the payee.

3. The information processing apparatus of claim 2, wherein the setting data includes payer data associated with each payer, the payer data including (a) an amount owed by the associated payer.

4. The information processing apparatus of claim 1, wherein the information identifying the settled transaction displayed by the screen includes (a) a timing of the settled transaction and (b) a store name of a store with which the settled transaction was conducted.

5. The information processing apparatus of claim 1, wherein the computer is configured to output the instruction data to an information terminal device used by the payer.

6. A method of managing remittance from a payer to a payee for paying at least part of a price of a settled transaction, comprising:
- receiving transaction specific information associated with the settled transaction, the transaction specific information including a date of the settled transaction and the price of the settled transaction;
- receiving, from a payee device, setting data associated with the settled transaction, the setting data including an amount to be paid by the payer;
- instructing a payer device to display a screen requesting remittance based on the setting data, wherein the screen requesting remittance displays information identifying the settled transaction associated with the setting data;
- receiving, from the payer device, one of (a) an acceptance notification indicating that the payer has agreed to provide the requested remittance or (b) a rejection notification indicating that the payer has refused to provide the requested remittance;
- in response to receiving the acceptance notification, initiating a payment from the payer to the payee;
- displaying, on the screen, via the payee device, a bill split process setting interface prompting a selection from among an equal split mode or a designated bill split mode, the equal split mode indicating payers to pay an equal amount of at least part of the price, the designated bill split mode allowing for each payer to select a different amount of at least part of the price, the bill split process setting interface including a button prompting an addition of a payer to the bill split process setting interface, the bill split process setting screen including a button prompting a confirmation that the price has been paid,
- the setting data including payer data associated with each payer, the payer data including information identifying the associated payer, including a name of the associated payer,
- the setting data further including an amount owed by the payer and a payment status associated with the payer for the settled transaction, the payment status to be displayed being one or more of a plurality of statuses, including (i) a first status that the amount owed is paid, (ii) a second status that the amount owed is unpaid, or (iii) a third status that the amount owed is refused to be paid, such that for a plurality of payers, the screen displays a plurality of payer names, the amount owed associated with each of the displayed payer names, and the payment status for each amount owed, and each different status among the plurality of statuses being depicted with a differently shaped graphical indicator.

7. The method of claim 6, wherein the settled transaction is a first settled transaction, wherein receiving transaction specific information associated with the settled transaction includes:
- receiving, from a settlement server, transaction specific information associated with a plurality of settled transactions, the plurality of settled transactions including the first settled transaction;
- instructing the payee device to display a screen requesting a selection of the first settled transaction from a list of the plurality of settled transactions; and
- receiving, from the payee device, the selection of the first settled transaction.

8. The method of claim 7, wherein the screen requesting the selection of the first settled transaction from the list of the plurality of settled transactions displays the date of the settled transaction, a store name of a store with which the settled transaction was conducted, and the price of the settled transaction for each settled transaction of the plurality of settled transactions.

9. The method of claim 6, wherein the method is a method of managing remittance from a plurality of payers to the payee for paying at least part of the price of the settled transaction, wherein the payer is a first payer.

10. The method of claim 9, wherein the payment status of the first payer is based on which of the acceptance notification or the rejection notification has been received.

11. The method of claim 6, further comprising, in response to receiving the refusal notification, instructing the payee device to provide a notification indicating that the payer has refused to provide the requested remittance.

12. The method of claim 6, wherein the information identifying the settled transaction associated with the setting data that is displayed by the screen requesting remittance includes the date of the settled transaction, a store name of a store with which the settled transaction was conducted, and the price of the settled transaction.

13. The method of claim 12, wherein the screen requesting remittance displays a first button configured to trigger output of the acceptance notification by the payer device and a second button configured to trigger output of the rejection notification by the payer device.

14. The method of claim 6, wherein instructing the payer device to display the screen requesting remittance includes providing a two-dimensional code to be displayed for reading by the payer device.

15. The method of claim 14, wherein providing the two-dimensional code to be displayed for reading by the payer device includes instructing the payee device to display a screen showing the two-dimensional code for reading by the payer device.

16. An information processing apparatus including a processor and a memory, the memory having instructions stored thereon that, when executed by the processor, cause the information processing apparatus to perform operations comprising:
- managing setting data relating to remittance for paying at least a part of a price associated with a settled transaction from a payer to a payee associated with the transaction;
- generating instruction data containing instructions for a payer device to display a screen requesting remittance from the payer based on the setting data, wherein the screen displays information identifying the settled transaction associated with the setting data;
- outputting the generated instruction data to the payer device; and
- displaying, on the screen, a bill split process setting interface prompting a selection from among an equal split mode or a designated bill split mode, the equal split mode indicating payers to pay an equal amount of at least a part of the price, the designated bill split mode allowing for each payer to select a different amount of at least part of the price, the bill split process setting interface including a button prompting the addition of a payer to the bill split process setting interface, the bill split process setting screen including a button prompting a confirmation that the price has been paid,
- the setting data including payer data associated with each payer, the payer data including information identifying the associated payer, including a name of the associated payer,
- the setting data further including an amount owed by the payer and a payment status associated with the payer for the settled transaction, the payment status to be displayed being one or more of a plurality of statuses, including (i) a first status that the amount owed is paid, (ii) a second status that the amount owed is unpaid, or (iii) a third status that the amount owed is refused to be paid, such that for a plurality of payers, the screen displays a plurality of payer names, the amount owed associated with each of the displayed payer names, and the payment status for each amount owed, and each different status among the plurality of statuses being depicted with a differently shaped graphical indicator.

17. The information processing apparatus of claim 16, wherein the setting data relates to remittance for paying at least a part of the price from each of a plurality of payers to the payee.

* * * * *